US006823195B1

(12) United States Patent
Boesen

(10) Patent No.: US 6,823,195 B1
(45) Date of Patent: Nov. 23, 2004

(54) ULTRA SHORT RANGE COMMUNICATION WITH SENSING DEVICE AND METHOD

(76) Inventor: Peter V. Boesen, 4026 Beaver Ave., Des Moines, IA (US) 50310

( * ) Notice: Subject to any disclaimer, the term of this patent is extended or adjusted under 35 U.S.C. 154(b) by 405 days.

(21) Appl. No.: 09/607,305

(22) Filed: Jun. 30, 2000

(51) Int. Cl.⁷ ................................................. H04Q 7/20
(52) U.S. Cl. ............................... 455/522.1; 455/422.1; 455/517; 455/66.1; 455/42; 455/554.2; 455/74.1; 455/87; 455/88; 455/550; 381/151; 375/132; 340/692
(58) Field of Search ............................. 455/422.1, 517, 455/66.1, 42, 522.1, 554.2, 74.1, 87, 88, 550, 421; 381/151; 375/132; 340/692

(56) References Cited

U.S. PATENT DOCUMENTS

| | | |
|---|---|---|
| 4,150,262 A | 4/1979 | Ono |
| 4,334,315 A | 6/1982 | Ono et al. |
| 4,374,382 A | 2/1983 | Markowitz |
| 4,528,987 A | 7/1985 | Slocum |
| 4,588,867 A | 5/1986 | Konomi |
| 4,654,883 A | 3/1987 | Iwata |
| 4,773,427 A | 9/1988 | Inoue et al. |
| 4,791,673 A | 12/1988 | Schreiber |
| 4,791,933 A | 12/1988 | Asai et al. |
| 5,010,890 A | 4/1991 | Pfohl et al. |
| 5,052,398 A | 10/1991 | Gober |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,381,798 A | 1/1995 | Burrows |
| 5,417,222 A | 5/1995 | Dempsey et al. |
| 5,422,934 A | 6/1995 | Massa |
| 5,458,123 A | 10/1995 | Unger |
| 5,613,222 A | 3/1997 | Guenther |
| 5,692,059 A | 11/1997 | Kruger |
| 5,721,783 A * | 2/1998 | Anderson .................... 381/312 |
| 5,771,438 A * | 6/1998 | Palermo et al. ............. 455/101 |
| 5,933,506 A * | 8/1999 | Aoki et al. .................. 381/151 |
| 5,987,146 A | 11/1999 | Pluvinage et al. |
| 6,021,207 A | 2/2000 | Puthuff et al. |
| 6,094,492 A * | 7/2000 | Boesen ........................ 181/130 |
| 6,112,103 A | 8/2000 | Puthuff |
| 6,181,801 B1 | 1/2001 | Puthuff et al. |
| 6,275,164 B1 * | 8/2001 | MacConnell et al. ........ 340/692 |
| 6,377,608 B1 * | 4/2002 | Zyren ........................... 375/132 |

FOREIGN PATENT DOCUMENTS

| | | |
|---|---|---|
| EP | 0 683 621 A | 11/1995 |
| GB | 2 074 817 A | 11/1981 |

OTHER PUBLICATIONS

Bell Labs, Wireless Research Laboratory, Internet pages printed Jun. 26, 2000.
Foschini, et al., BLAST: Bell Labs Layered Space–Time, Internet pages printed Jun. 26, 2000.

(List continued on next page.)

Primary Examiner—Erika Gary
Assistant Examiner—David Nguyen
(74) Attorney, Agent, or Firm—McKee, Voorhees & Sease, P.L.C.

(57) ABSTRACT

A method of communicating of the present invention includes broadcasting a signal from a transmission point. The power of the signal is limited such that the signal will attenuate within a predetermined distance from the transmission point. The signal is received by a receiver. A communication system includes a transmitter and a receiver. The transmitter is adapted to broadcast a first signal which attenuates within a predetermined distance from the transmitter. The receiver is adapted to receive the first signal. The method and system can be used to imperceptibly transmit voice data.

12 Claims, 5 Drawing Sheets

OTHER PUBLICATIONS

Bluetooth, The Official Bluetooth Website, Internet pages printed Jun. 26, 2000.

Article entitled "A One–Size Disposable Hearing Aid Is Introduced," by Wayne J. Staab, Walter Sjursen, David Preves and Tom Sequeglia, pp. 36–41, The Hearing Journal, Apr. 2000, vol. 53, No. 4.

Article entitled "The Hearing Review," Jan. 1999, vol. 3: Hearing in Noise (Supplement), pp. 1–62.

Air Magic Wireless Headset User Guide.

Article entitled "Agilent Technologies Announces Availability of Wireless Network Cap for Portable Patient Monitor," http://www.

Article entitled "Agilent Technologies Introduces New Telemon Patient Monitor," http://www.healthcare.agilent.com/press–release.

Article entitled "Brain cancer victim sues cell–phone providers," http://www.cnn.com/2000/TECH/.computing.08/08/cellular.cancer.lawsuit.idg/index/html.

Article entitled "M3 and M4 Series Patient Monitors," http://www.healthcare.agilent.com/show_product.pl?M3%20and20M4%.

Article entitled "Report Urges Curbs on Mobile Phone Use," May 15, 2000, http://www.techweb.com/wire/story/TWB20000515S005.

Article entitled "Scientist link eye cancer to mobile phone," by Jonathan Leake, Jan. 14, 2001; http://www.Sunday–times.co.uk/news/pages/stie/2001/01/14/stinwenws01032.html.

Article entitled "The latest on cell phone emissions".

Article entitled "U.S. Will Oversee Cell–Phone Safety Studies," Jun. 9, 2000 http://www/techweb.com/wire/story/reuters/REU20000609S0003.

Article entitled "What is a Wireless LAN?," 1998, Proxim, Inc.

Article entitled "Wireless Worries: Are Cell Phones a Danger to You and Your Children," May 26, 2000; http://www.more.abcnews.go.com/onair/2020/2020_000526_cellphones.html.

* cited by examiner

ULTRA SHORT RANGE COMMUNICATION WITH SENSING DEVICE AND METHOD

BACKGROUND OF THE INVENTION

A. Field of the Invention

The present invention relates to communication and methods of sensing and communicating the sensed information. More particularly, but not exclusively, the present invention relates to utilizing an ultra low power signal to transmit information over a short distance.

B. Problems in the Art

Wireless communication devices continue to proliferate in both homes and offices, among other places. From wireless LANs, to cell phones, to baby monitors, to remote controls, the number of wireless devices is increasing at a great rate. In the future, it is anticipated that even more devices will be able to be controlled through wireless communications.

The increase in wireless communication devices has brought about a number of problems. First, the more devices there are that utilize radio communications, the more likely it is that these devices will interfere with one another when they are placed in close proximity. There is a need for a method which allows for devices to be placed in close proximity while preventing interference with one another.

In addition, exposure to electromagnetic radiation has been linked with health problems. Currently, the trend is toward utilizing signals with greater power so these signals can travel a greater distance. Increasing the power of the signal increases its radiation output. There is a concern that this increase in radiation will lead to even greater health problems. There is a need in the art for a method which reduces radiation exposure.

In addition to interference and health problems, there are other problems associated with high power signals. The generation of high powered signals requires the consumption of a relatively large amount of power. Since many transmitters are battery powered, it is undesirable to have to constantly change batteries as the batteries become drained from generating the signal. In addition, the production of higher power signals generates more heat as a by-product. This additional heat can lead to component failures in conventional transmitters. Also, high power signals are easier to intercept and also cause more multi-path problems. There is a need in the art for a method and system which minimizes these problems.

Therefore, it is the primary object of the present invention to provide a communication system and method which limits electromagnetic interference.

It is a further object of this invention to provide a communication system and method which limits radiation exposure.

It is a further object of the present invention to provide a communication system and method which reduces energy consumption.

It is a further object of the present invention to provide a communication system and method which provides for signal privacy.

These, as well as other objects and features of the present invention, will be apparent from the following detailed description and claims in conjunction with the accompanying drawings.

SUMMARY OF THE INVENTION

The present invention includes a new method of communicating which has the advantages of limiting electromagnetic interference while consuming low power. The method includes the step of broadcasting a first signal from a transmission point. The power of the first signal is limited so that the signal attenuates within a predetermined distance from the transmission point. Subsequently, the signal is received by a receiver within the predetermined distance from the transmitter.

The present invention can also include a novel communication system which has the advantages of limiting electromagnetic interference while consuming low power. The system includes a transmitter which is adapted to broadcast a first signal. The transmitter is also adapted to limit the power of the first signal so that the first signal will attenuate within a predetermined distance from the transmitter. The communication system also includes a receiver which is adapted to receive the first signal, and is placed within the predetermined distance from the transmitter.

DETAILED DESCRIPTION OF AN EXEMPLARY EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1:
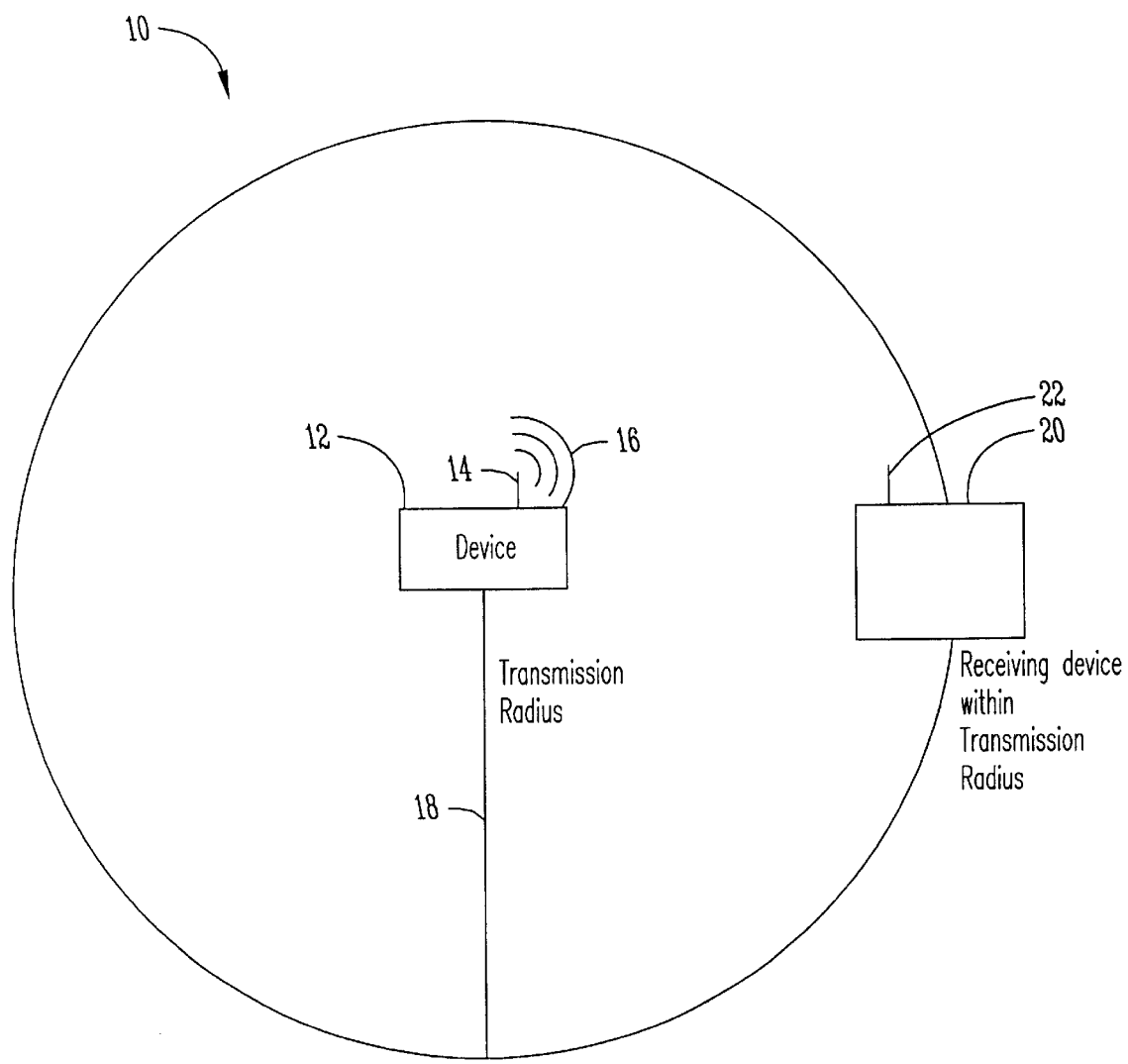
FIG. 1 is a schematic diagram illustrating a limited range transmission protocol according to the present invention.

FIG. 1 is a schematic diagram of an embodiment of a method of communicating 10 according to the present invention. A device or transmitter 12 has an antenna 14 through which it outputs a low power radio frequency signal 16. Antenna 14 may be a directional or an omni-directional antenna. Transmitter 12 is configured such that signal 16 will attenuate at or inside transmission radius 18, the length of transmission radius 18 being predetermined. The actual power of the broadcast signal will depend on a number of factors, such as the frequency of the signal, the distance in which the signal should attenuate, the temperature and humidity of the environment in which the signal is broadcast, etc. The broadcast signal is preferably a radio frequency signal at about either 900 MHz or 2.4 GHz, as these two frequencies are still open to the public. Preferably, the broadcast signal is a digital spread spectrum signal.

A receiver or receiving device 20 is located at or inside the perimeter of the transmission radius 18. The receiver is adapted to receive signal 16. In most applications, the transmission radius 18 will be less than 20 feet, usually falling in the 10–12 foot range. Receiver 20 has an antenna 22 to receive signal 16.

Since signal 16 is designed to attenuate inside the transmission radius 18, an eavesdropping device would have to be placed inside transmission radius 18 to intercept signal 16. Thus, it is unlikely that signal 16 will be intercepted. In addition, since signal 16 is extremely low powered, electromagnetic radiation exposure is greatly decreased and minimal power is consumed in generating signal 16.

Figure 2:
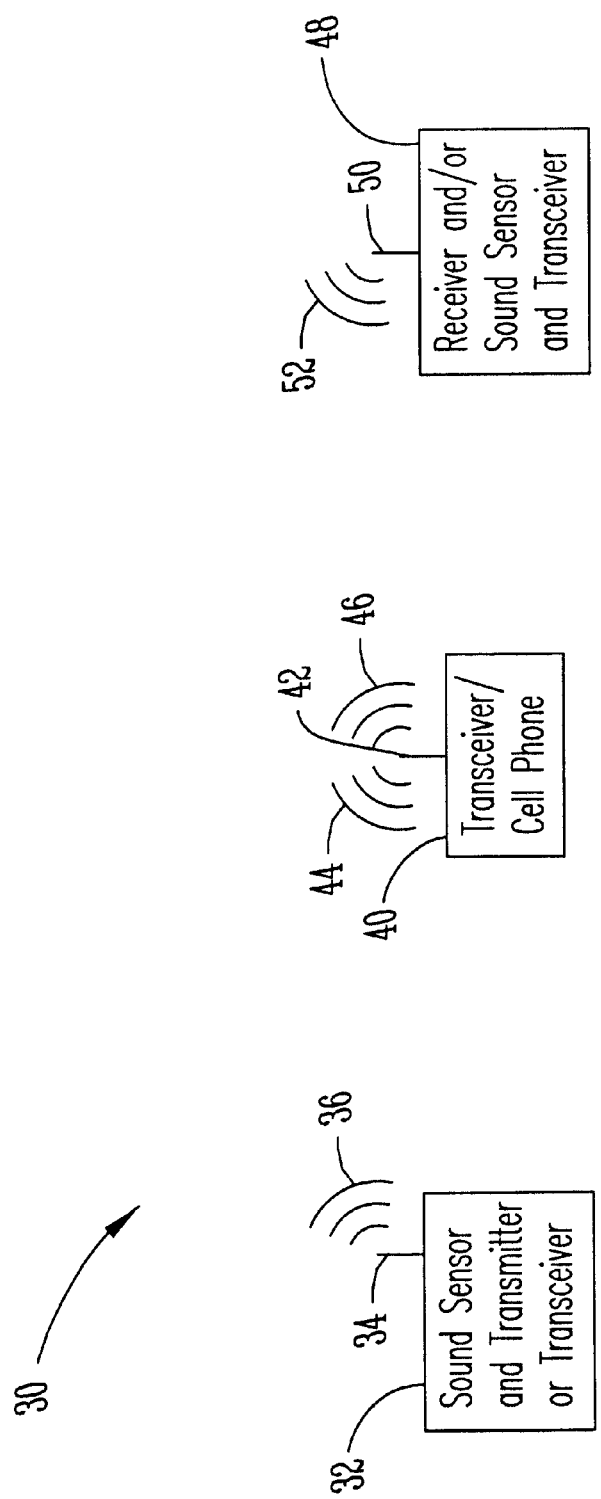
FIG. 2 is a block diagram illustrating an embodiment of a communication method according to the present invention.

FIG. 2 shows a block diagram of a voice communication system 30 according to an embodiment of the present invention. The system 30 includes a sound sensor and transmitter or transceiver 32. The sound sensor generates an electrical output which is used to modulate an output signal 36. The transmitter includes an antenna 34 which is used to broadcast signal 36.

Communication system 30 also includes a transceiver 40 having an antenna 42. Transceiver 40 can be configured to broadcast a signal 44 which is received by transceiver 32, depending on whether sound sensor 32 includes a receiver. Antenna 42 is also adapted to broadcast a signal 46 which is received by receiver 48. Transceiver 40 may have more than one antenna, depending on the desired configuration.

Receiver 48 has an antenna 50. Antenna 50 is adapted to receive signal 46. In addition, receiver 50 may be a transceiver with a sound sensor as an input to the transmitter. Receiver 48 may broadcast signal 52 through its antenna 50.

A sound sensor and transmitter combination 32 which is particularly well-suited for communication method 30 is disclosed in co-pending U.S. Ser. No. 09/309,107, filed May 10, 1999, and U.S. Ser. No. 09/416,168, filed Oct. 11, 1999, the disclosures of which are hereby incorporated by reference in their entirety.

Figure 3:
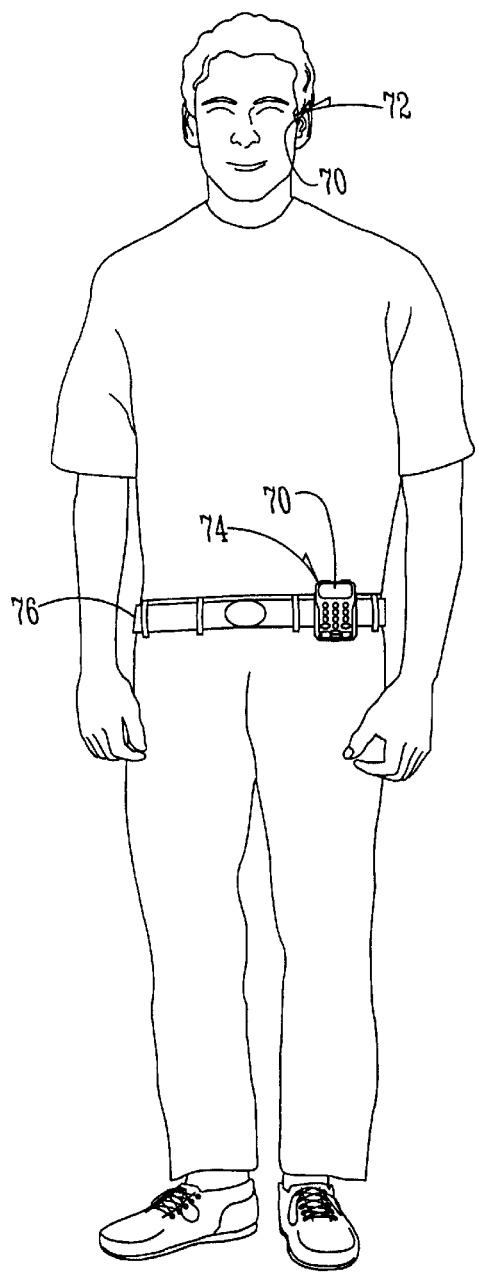
FIG. 3 is a pictorial view showing a user wearing a receiver and transmitter system.

FIG. 3 illustrates a receiver and transmitter system 70 as worn by a user. The user wears the ear piece 72 and the transceiver unit 74. The transceiver unit 74 may be worn on the user's belt 76, though it is also possible to store the transceiver unit 74 in a number of other areas which may be convenient for the user, such as a shirt pocket, coat pocket, or vest pocket.

Figure 4:
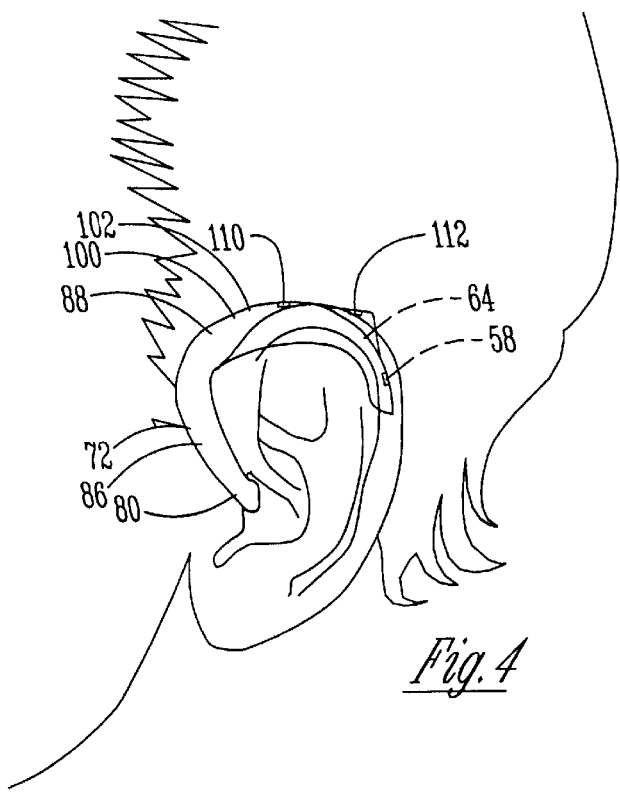
FIG. 4 is a perspective view of the ear piece unit of the receiver and transmitter system of FIG. 3.

As seen in FIG. 4, the ear piece 72 includes an external ear canal portion 80 having a bone conduction sensor 82 in contact with the external auditory canal epithelium of the user, an air conduction sensor or microphone 85, and a speaker 84. A casing 86 is also provided, having an ear attachment portion 88 and a fitting portion 90 that connects the ear attachment portion 88 with the bone conduction sensor 82, the air conduction sensor 85, and speaker 84. The ear attachment portion 88 is contoured to comfortably fit into the angle between the ear auricle and the temporal bone of the skull of the user and is preferably made of a lightweight aluminum or plastic material. It can be appreciated that the primary purpose of the ear attachment portion 88 is to secure the ear piece 72 in proper position. The fitting portion 90 is integral with the ear attachment portion 88 and is reinforced with a flexible wire so that the ear piece 72 may be adapted to fit the user and maintain the bone conduction sensor 82 and the air conduction sensor 85 in their proper positions with the external auditory canal 94 of the user.

Figure 5:
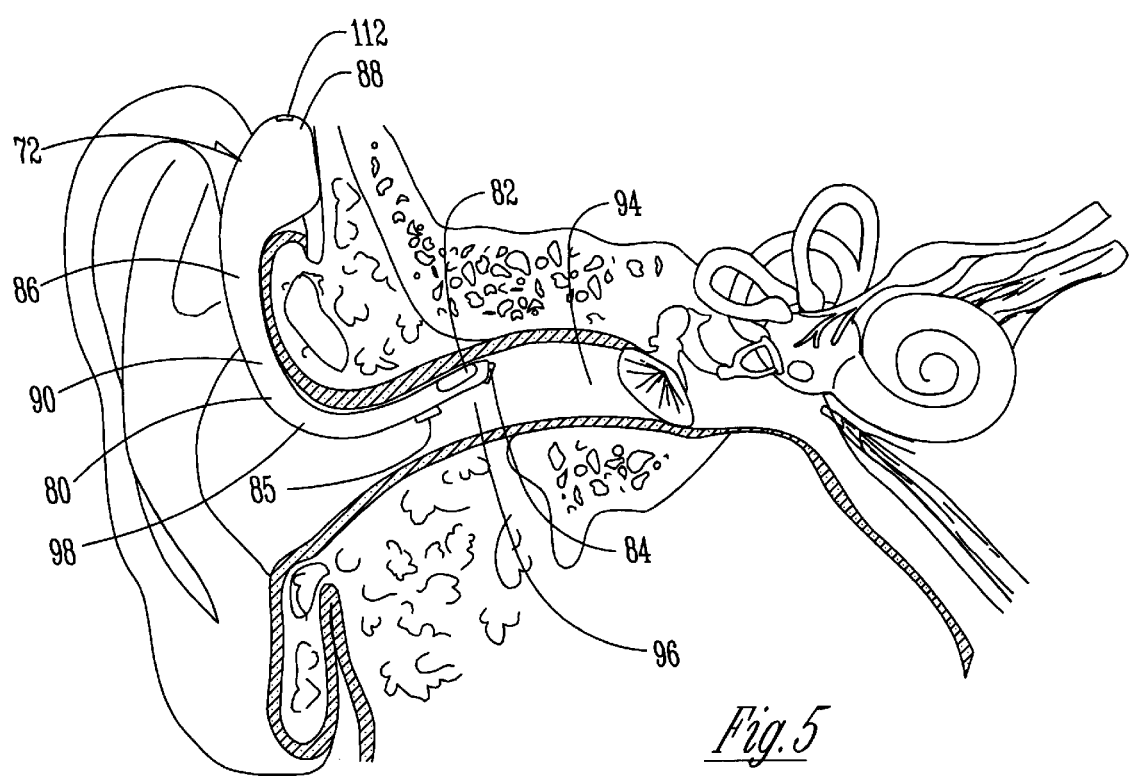
FIG. 5 is a cross-sectional view of the ear piece unit of FIG. 4 taken through the external auditory canal of the user.

As is best shown in FIG. 5, the ear piece 72 should be fit so that the bone conduction sensor 82 is in contact with a portion of the external auditory canal 94 near the bony-cartilaginous junction. It is preferred that the bone conduction sensor 82 rest against the posterior superior wall of the external auditory canal 94, with the flexible wire of the fitting portion 90 shaped to bias the bone conduction sensor 82 into position. Fitting the device and calibrations may be performed by the user or with the assistance of a physician or an audiologist/audiology technician.

The external ear canal portion 80 is formed so that the bone conduction sensor 82 may be inserted into the external auditory canal 94 of the user and nonocclusively contact against the posterior superior wall of the bony canal. The bone conduction sensor 82 is intended to pick up, as the voice signals, the vibrations of the upper wall of the external auditory canal 94 at the time of uttering the voice sounds. When the user utters voice sounds, these sounds reach the mastoid bones. These sound vibrations in the external auditory canal portion in contact with the bone sensor 82 are then processed.

In addition to the bone conduction sensor 82, the external ear canal portion 80 also includes an air conduction sensor or microphone 85. Like the bone conduction sensor 82, the air conduction sensor 85 is of standard construction and may be obtained from various hearing aid manufacturers.

A resilient member 96 is preferably positioned between the air conduction sensor 85 and the bone conduction sensor 82 in such a manner that the external sound collected by the air conduction sensor 85 will not be transmitted to the bone conduction sensor 82. Additionally, the external ear canal portion 80 also includes a speaker 84. The speaker 84 is of a type well known in the art and common in the hearing aid industry. The speaker 84 is positioned directly in line with the tympanic membrane to facilitate clear transmissions while maintaining a low power output.

A circuit portion 98 transmits the electrical signals from both the bone conduction sensor 82 and the air conduction sensor 85 to a speech processor 100. The bone conduction sensor 82 and the air conduction sensor 85 are both tuned to receive frequencies within the range of audible human speech, approximately 50 to 8000 Hertz.

The speech processor 100 is of a conventional construction used in many hearing aids and employs a digital or analog processing scheme to package the voice signal for transmission across a wireless linkage. The speech processor 100 will be programmed to extract similarities from air and bone transmission, comparing the similarities in signal and then transmitting via a wireless linkage to a cellular telephone transceiver or other receiving device. The speech processor 100 also filters out through band pass filters 102 sounds outside the frequency of normal human speech.

The speech processor 100 samples a portion of the electrical signals of voice sound information from the air conduction sensor 85 and a portion of the electrical signals of voice sound information from the bone conduction sensor 82. The speech processor 100 then transmits the selected voice signal to an ear piece transceiver 64. The ear piece transceiver 64 is preferably a wireless radio frequency transceiver well known in the art which includes a multi directional antenna 112. The ear piece transceiver 64 sends the voice signal to the transceiver unit 74. The voice signal from ear piece transceiver 64 may be a short range signal (see FIG. 1). The ear piece transceiver 64 also receives incoming signals from the transceiver unit 74 and sends them to the speaker 84.

The transceiver unit 74 includes componentry which is common in the art. The transceiver unit 74 receives the relatively low powered radio frequency (RF) signals from the ear piece transceiver 64 via an RF local area network antenna, processes the signal, and transmits an amplified RF signal. Further, the transceiver unit 74 receives incoming data through a linkage antenna and transmits this to the ear piece transceiver 64 using the low powered RF signals. The transceiver unit 74 may transmit or receive using analog or digital technology.

Figure 6:
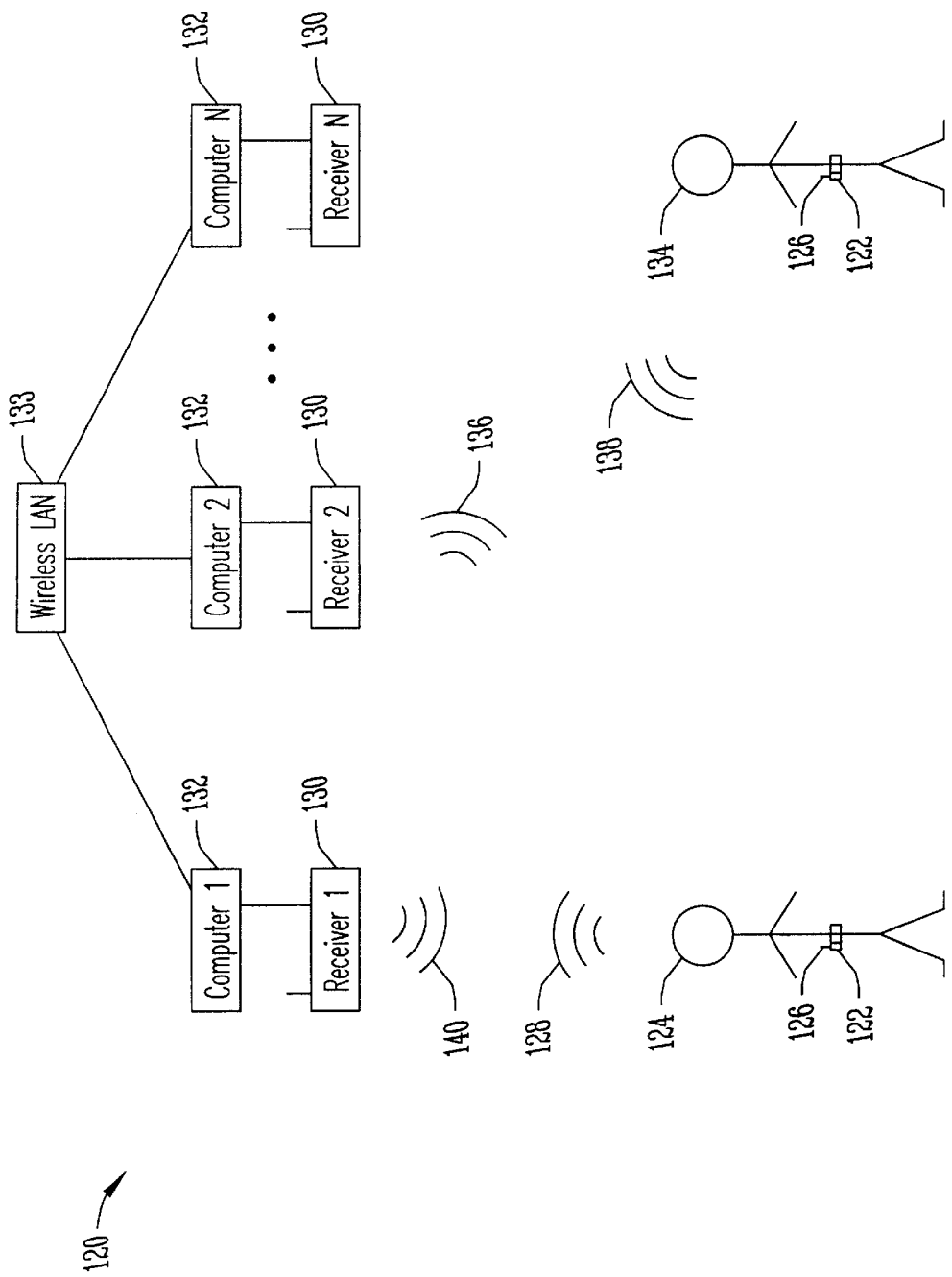
FIG. 6 is a pictorial diagram illustrating a communication system according to the present invention.

FIG. 6 is a pictorial diagram which shows a communication system 120, illustrating an implementation of the communication system 10 shown in FIG. 1. The system 120 is well-suited for use in a home or office environment. A transmitter 122 is worn by a person 124. Transmitter 122 could be a transceiver. Rather than merely a transmitter, a transmitter system 70 (FIGS. 3–5) could be worn by person 124. Transmitter 122 has an antenna 126 which outputs a low power signal 128. Signal 128 is a low power signal such that it will attenuate within a predetermined distance. Signal 128 preferably contains information which identifies the person 124 to whom transmitter 122 is attached. For example, signal 128 could be a spread spectrum signal with a digital identifier imposed on signal 128.

Receivers 130 are placed in various locations throughout the house or office. Receivers 130 could be transceivers. Transceivers could be used for two-way communication if transmitter 122 is a transceiver, or a transmitter system 70 (FIGS. 3–5) is used. Receiver 130 can be adapted to receive signal 128.

Receivers 130 may be in operative communication with a computer 132. The computers or computers may be part of a wireless local area network (LAN) 133. Additionally, receiver 130 may have its own processing capability. Receiver 130 could be configured to perform a function when it detects or receives signal 128. For example, receiver 130 could be connected to the lights in a room. When signal 128 is received by receiver 130, the lights could be turned on. Since signal 128 is a low power signal, receiver 130 would "know" that person 124 is no longer in the room when the signal 128 is no longer being received. When signal 128 is not received, receiver 128 could turn the lights off.

Signal 128 preferably contains information which identifies person 124. Thus, communication system 120 allows for localized tracking of person 124 within a building or structure. Since only those receivers 130 which are within the transmission radius (FIG. 1) will be able to receive signal 128, a person's 124 location will be known based on which receivers 130 are receiving signal 128.

As mentioned, transmitter 122 could be a transmitter system 70 (FIGS. 3–5) to allow for two-way communications of voice. Receiver 130 and its associated computer 132 could be tied into a phone line. With receiver 130 as a transceiver, when a call came in on a phone line, computer 132 could cause transceiver 130 to send a signal to transmitter 122. Thus because transmitter 122 (transmitter system 70) can function as a phone which is worn at all times, an incoming call can be sent directly to person 124, rather than person 124 having to retrieve a phone to receive the call.

It should be noted that communication system 120 allows for undetectable, or nearly undetectable, two-way voice communication. For example, a transceiver 130 could be placed in the ceiling of a conference room. A person 124 wearing a transmitter system 70, could communicate a voice signal (via the bone and/or air conduction sensors) to the transceiver 130. Transceiver 130 could then broadcast a second signal 136 which contains the voice information to either a person 134 wearing a transmitter system 122, or to a computer outside the conference room. The voice data could be communicated through a wireless LAN and displayed on a monitor to communicate information to an intended recipient. Subsequently, the outside person 134 could transmit a third signal 138 containing voice information back to transceiver 130. Transceiver 130 could then send a fourth signal 140 to transmitter system 70 (or transmitter 122) of person 124 to drive speaker 84 (FIG. 5).

A general description of the present invention as well as a preferred embodiment has been set forth above. Those skilled in the art will recognize and be able to practice additional variations in the methods and devices described which fall within the teachings of this invention. Accordingly, all such modifications and additions are deemed to be within the scope of the invention which is to be limited only by the claims appended hereto.

I claim:

1. A new method of communicating which has the advantages of consuming low power and limiting electromagnetic interference, comprising:

capturing voice sound information using a bone conduction sensor of an earpiece;

associating a digital identifier with the voice sound information;

broadcasting a first signal from the earpiece, the first signal including both the voice sound information and the digital identifier;

limiting the power of the first signal so that the first signal attenuates within a predetermined distance from the earpiece; and receiving the first signal.

2. The method of claim 1, wherein the predetermined distance is 20 feet or less.

3. The method of claim 1, wherein the predetermined distance is 10 feet or less.

4. The method of claim 1 further comprising capturing voice sound information using an air conduction sensor of the earpiece.

5. The method of claim 1, further comprising:

performing a function when the first signal is received.

6. The method of claim 5, wherein the function is turning on lights in a room.

7. The method of claim 1, further comprising recovering and reproducing for a desired listener the voice data from the second signal.

8. The method of claim 7, wherein the transmission, recovery, and reproduction of voice data is imperceptible to undesired people.

9. The method of claim 7, wherein the voice data from the first signal is sent through a wireless LAN to an intended recipient.

10. The method of claim 1, wherein the first signal is received by a cell phone.

11. The method of claim 4, wherein the first signal is received by a cell phone.

12. The method of claim 1 wherein the digital identifier identifies a person associated with a transmitter of the earpiece.

* * * * *